United States Patent [19]
Motykiewicz

[11] Patent Number: 5,161,778
[45] Date of Patent: Nov. 10, 1992

[54] NONFREEZING PLUNGER FOR SOLENOID VALVE

[75] Inventor: Krystyn Motykiewicz, Southington, Conn.

[73] Assignee: Rostra Precision Controls, Inc., Waterbury, Conn.

[21] Appl. No.: 767,486

[22] Filed: Sep. 30, 1991

[51] Int. Cl.⁵ .......................... F16K 1/48; F16K 31/06
[52] U.S. Cl. ................................ 251/129.15; 251/84; 251/368; 251/356
[58] Field of Search ...................... 251/77, 84, 129.15, 251/368, 356; 137/625.65

[56] References Cited

U.S. PATENT DOCUMENTS

| | | | |
|---|---|---|---|
| 3,542,333 | 11/1970 | Stampfli | 137/625.65 X |
| 3,549,119 | 12/1970 | Sellers | 251/84 |
| 3,905,689 | 9/1975 | Mylander | 251/77 |
| 4,159,026 | 6/1979 | Williamson | 137/625.65 X |

Primary Examiner—Arnold Rosenthal
Attorney, Agent, or Firm—MacMillan, Sobanski & Todd

[57] ABSTRACT

Solenoid valve employing a loosely mounted rubber insert in a confining recess of the plunger for sealing an inlet port during closed condition of the valve. In case of adherence at the sealing surface of the inlet port with the rubber insert, initial acceleration of the plunger establishes an inertia impact to effectively break the bond, even at extremely low temperature.

6 Claims, 1 Drawing Sheet

NONFREEZING PLUNGER FOR SOLENOID VALVE

BACKGROUND OF THE INVENTION

It is conventional in prior art construction of solenoid valves, to employ molded metallic plungers where rubber is packed and vulcanized to the body or inserts are press-fitted into the body resulting, in either case, with rubber rigidly connected to the metal part. At low temperatures, usually below 0° Fahrenheit, when certain chemicals used in rubber production, such as plasticizers, start to solidify, a strong bond between the rubber and valve seat may occur. Also, the rubber itself becomes much stiffer, which in effect, creates a rigid metal/rubber structure "glued" to the valve seat. A solenoid, when energized in this condition, is frequently incapable to generate enough force to break the bond and thus the valve may remain "frozen".

BRIEF DESCRIPTION OF THE PRESENT INVENTION

Applicant has discovered and confirmed in practice that a loosely mounted rubber pad in the form of a rubber insert in one or both ends of the solenoid body, allows the plunger to move some distance and acquire momentum before it hits the rubber insert. The impact force released following take-up of clearance has been found to break the bond instantly ensuring an uninterrupted function, even at extremely low temperatures.

DETAILED DESCRIPTION OF THE PREFERRED EMBODIMENT

Figure 1:
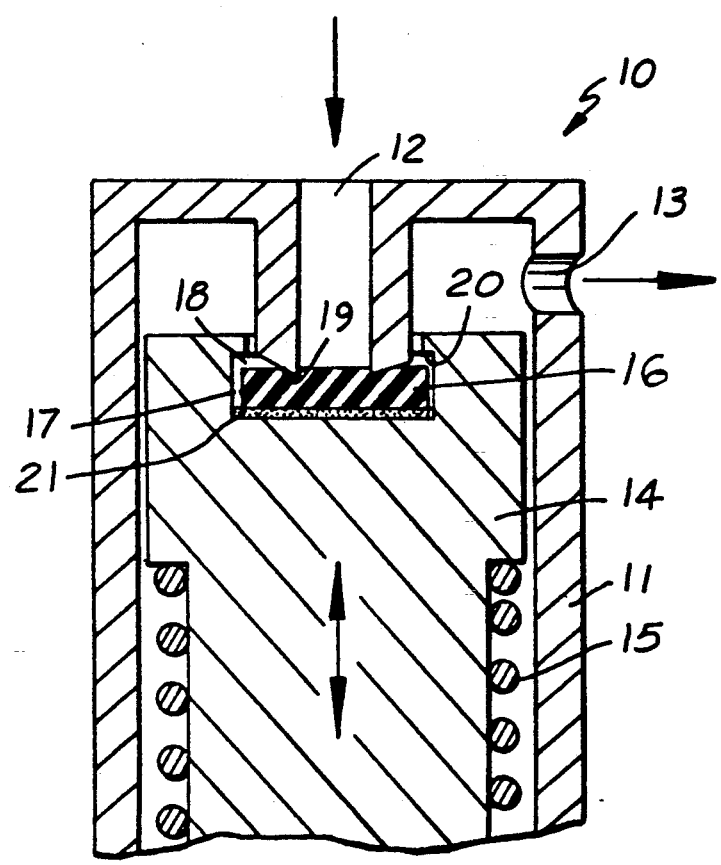
FIG. 1 is a fragmentary sectional side elevation of a metallic solenoid body having a rubber insert loosely mounted inside the body in accordance with the present invention.

With reference to the drawing, solenoid valve 10 includes cylindrical metal housing 11 having inlet port 12 and outlet 13 with cylindrical plunger body 14 held by spring 15 in normally closed position, causing rubber insert 16 in an end plunger recess to seal the inlet port. Insert 16 is loosely mounted with side clearance 17 and axial clearance 18 within the plunger recess when sealing engagement is established at 19.

Upon energizing the solenoid to produce downward movement of plunger body 14, in case of adherence at the sealing engagement 19, initial acceleration of the plunger body in a downward direction occurs during the take-up of clearance at 18 before engagement of the plunger body annular lip 20 with the greater diameter outer perimeter of rubber insert 16 providing an inertia force impact, which as stated above has been found sufficient to dependably break the bond instantly ensuring an uninterrupted function even at extremely low temperatures. Talcumer or graphite powder 21, shown exaggerated on the underside of rubber insert 16, prevents adherance at the rubber to metal seating surfaces and stays in place indefinitely since there is no flow on the underside of the rubber insert to blow the powder off.

I claim:

1. A valve assembly comprising:
    a housing having a port formed therein;
    a plunger slidably disposed within said housing, said plunger including an outer surface having a recess formed therein defining a bottom, said plunger further including a flange formed integrally with said plunger, said flange extending inwardly about said recess;
    an insert disposed within said recess of said plunger
    means for moving said plunger between a first position, wherein said insert is moved into engagement with said port to prevent fluid communication therethrough and said insert is completely spaced apart from said flange, and a second position, wherein said insert is moved out of engagement with said port to permit fluid communication therethrough; and
    anti-adherence powder provided between said bottom of said recess and said insert.

2. The invention defined in claim 1 wherein said recess defines a width of said recess, and wherein said insert has a width which is less than said width of said recess.

3. The invention defined in claim 2 wherein said said recess and said insert are cylindrical in shape.

4. The invention defined in claim 1 wherein said flange defines a depth of said recess extending between said flange and said bottom.

5. The invention defined in claim 4 wherein said insert has a thickness which is less than said depth of said recess.

6. The invention defined in claim 4 wherein said flange extends parallel to said bottom.

* * * * *